US010022856B2

(12) United States Patent
Bensman et al.

(10) Patent No.: US 10,022,856 B2
(45) Date of Patent: Jul. 17, 2018

(54) METAL AND PLASTIC CONTAINER

(75) Inventors: Mark Bensman, Rosh Ha'Ayin (IL);
Yosi Sabbag, Holon (IL); Iftach Galler, Kfar-Hess (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 528 days.

(21) Appl. No.: 13/014,193

(22) Filed: Jan. 26, 2011

(65) Prior Publication Data

US 2011/0181008 A1 Jul. 28, 2011

Related U.S. Application Data

(60) Provisional application No. 61/299,239, filed on Jan. 28, 2010.

(51) Int. Cl.
*B25H 3/00* (2006.01)
*B25H 3/02* (2006.01)
*B62B 1/12* (2006.01)

(52) U.S. Cl.
CPC ............. *B25H 3/026* (2013.01); *B25H 3/02* (2013.01); *B25H 3/028* (2013.01); *B62B 1/12* (2013.01); *B62B 2202/12* (2013.01); *B62B 2202/48* (2013.01)

(58) Field of Classification Search
CPC .......... B25H 3/02; B25H 3/026; B25H 3/028; B62B 1/12; B62B 2202/12; B62B 2202/48
USPC ......... 220/23.86, 23.88, 611, 613, 617, 660; 206/372, 373; 280/47.26, 47.19, 47.35; 312/108, 249.8, 902, 237, 244, 249.1
See application file for complete search history.

(56) References Cited

U.S. PATENT DOCUMENTS 1,761,331 A 6/1930 Dewey
3,160,311 A * 12/1964 Provi .................. B65F 1/02
220/618
3,161,345 A 12/1964 McLeod
(Continued)

FOREIGN PATENT DOCUMENTS

DE 102007017834 * 11/2007 ............... A45C 5/00
EP 1 101 574 5/2001
(Continued)

OTHER PUBLICATIONS

Extended Search Report as issued for European Patent Application No. 11152538.2, dated May 20, 2011.

*Primary Examiner* — J. Gregory Pickett
*Assistant Examiner* — Elizabeth Volz
(74) *Attorney, Agent, or Firm* — Pillsbury Winthrop Shaw Pittman LLP

(57) ABSTRACT

A container includes a peripheral wall having a first side, a second side, and a third side formed from a single sheet of metal material. The sheet of metal material has opposite first and second connecting ends. A plastic connector is connected to the first connecting end and the second connecting end of the sheet metal, and a plastic bottom is connected with a bottom end of the peripheral wall. Another aspect provides a container that includes a sheet of metal having a louver formed therein and a plastic structure having opposing surfaces that define a receiving space therebetween. At least one of the surfaces has a projection thereon and the louver are received within the receiving space. An edge of the louver engages with the projection to prevent the louver from being removed from the receiving space.

23 Claims, 14 Drawing Sheets

(56) References Cited

U.S. PATENT DOCUMENTS

| | | | |
|---|---|---|---|
| 3,692,204 A | | 9/1972 | Provi et al. |
| 3,746,210 A | | 7/1973 | Evans |
| 5,447,318 A | | 9/1995 | Gantz et al. |
| 5,474,196 A | * | 12/1995 | Fausel .................. D06F 95/002 |
| | | | 220/4.28 |
| 6,152,552 A | * | 11/2000 | Snoke ................ A47B 47/0075 |
| | | | 312/257.1 |
| 6,176,559 B1 | | 1/2001 | Tiramani et al. |
| 6,213,328 B1 | | 4/2001 | Tiramani et al. |
| 6,347,847 B1 | | 2/2002 | Tiramani et al. |
| 6,415,924 B1 | | 7/2002 | Lee |
| 6,601,930 B2 | | 8/2003 | Tiramani et al. |
| 7,059,472 B2 | | 6/2006 | Lai |
| 7,200,899 B2 | | 4/2007 | Sagol |
| 7,334,680 B2 | | 2/2008 | Cunningham et al. |
| 8,132,819 B2 | * | 3/2012 | Landau .................. B25H 3/027 |
| | | | 280/47.131 |
| 2003/0075468 A1 | | 4/2003 | Story et al. |
| 2006/0201833 A1 | | 9/2006 | Chen |
| 2006/0266778 A1 | | 11/2006 | Allotey |
| 2010/0290877 A1 | | 11/2010 | Landau et al. |

FOREIGN PATENT DOCUMENTS

| | | | | |
|---|---|---|---|---|
| EP | 1101574 | * | 5/2001 | ............... B25H 3/02 |
| EP | 1 283 093 | | 2/2003 | |
| EP | 1 657 179 | | 5/2006 | |
| EP | 1657179 | * | 5/2006 | ............. B65D 77/04 |
| EP | 1 921 012 | | 5/2008 | |

\* cited by examiner

METAL AND PLASTIC CONTAINER

CROSS-REFERENCE TO RELATED APPLICATIONS

The present application claims the benefit of priority from U.S. Provisional Patent Application No. 61/299,239, filed on Jan. 28, 2010, the content of which is incorporated herein by reference in its entirety.

FIELD OF THE INVENTION

The present invention relates to a metal and plastic container.

BACKGROUND OF THE INVENTION

Numerous storage containers are known in the art. However, there is a constant need in the industry to improve upon existing containers by making them more efficient to manufacture and assemble and easy to use.

SUMMARY OF THE INVENTION

One aspect provides a container including a peripheral wall having a first side, a second side, and a third side formed from a single sheet of metal material. The sheet of metal material has opposite first and second connecting ends, and a plastic connector is connected to the first connecting end and the second connecting end of the sheet metal. A plastic bottom is connected with a bottom end of the peripheral wall.

Another aspect provides an apparatus for transporting articles between working locations that includes a base container having an interior space in which articles to be transported can be stored. The apparatus further includes one or more rotatable ground engaging wheels mounted toward the bottom of the apparatus for rotation about an axis to provide rolling support for the apparatus. The apparatus also includes at least one removable container having (i) a container portion with an interior space in which articles to be transported can be stored, (ii) a lid pivotally connected to the container portion; (iii) at least one latch constructed to secure the lid in covering relation with respect to the container portion, and (iv) a carrying handle attached to the lid and that is manually graspable to enable carriage of the removable container. A manually engageable pulling handle of the apparatus and the one or more ground engaging wheels are arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction. The removable container is constructed and arranged to be latched above the base container. The container portion thereof includes a peripheral wall having a first side, a second side, and a third side formed from a single sheet of metal material. The sheet of metal material has opposite first and second connecting ends, and a plastic connector is connected to the first connecting end and the second connecting end of the sheet metal. A plastic bottom is connected with a bottom end of the peripheral wall.

Another aspect provides a container that includes a sheet of metal having a louver formed therein. The container also includes a plastic structure having opposing surfaces defining a receiving space therebetween. At least one of the surfaces has a projection thereon. The louver is received within the receiving space, and an edge of the louver engages with the projection to prevent the louver from being removed from the receiving space.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
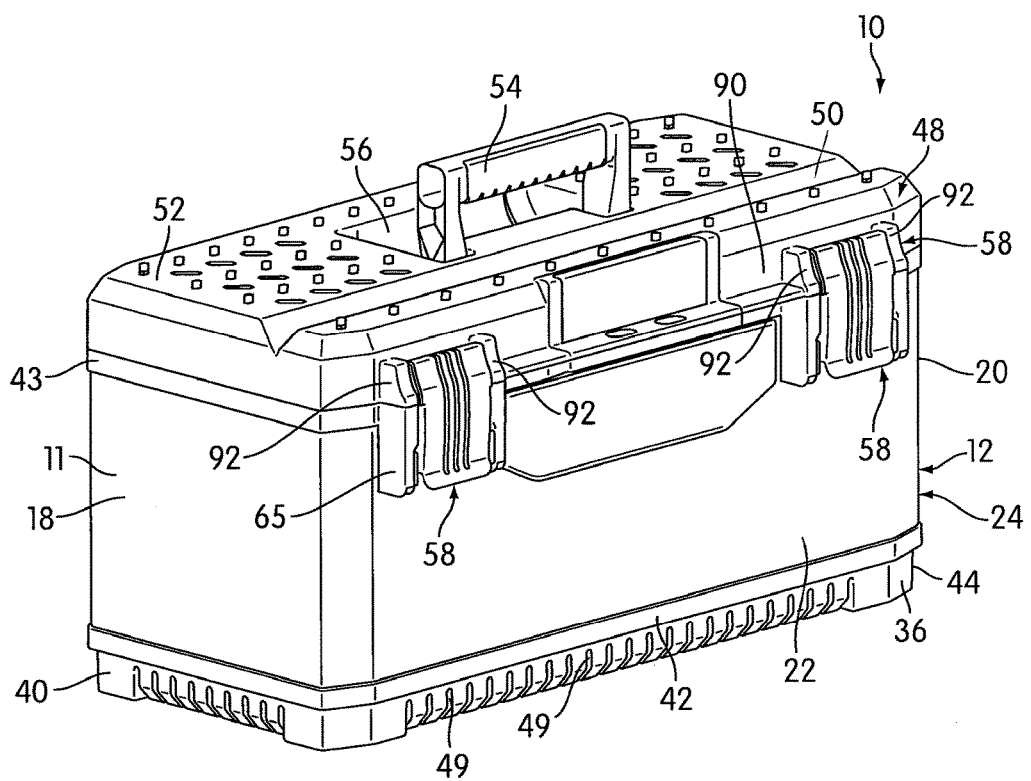
FIG. 1 is a front perspective rear view of a container in accordance with an embodiment of the present invention.
Figure 3:
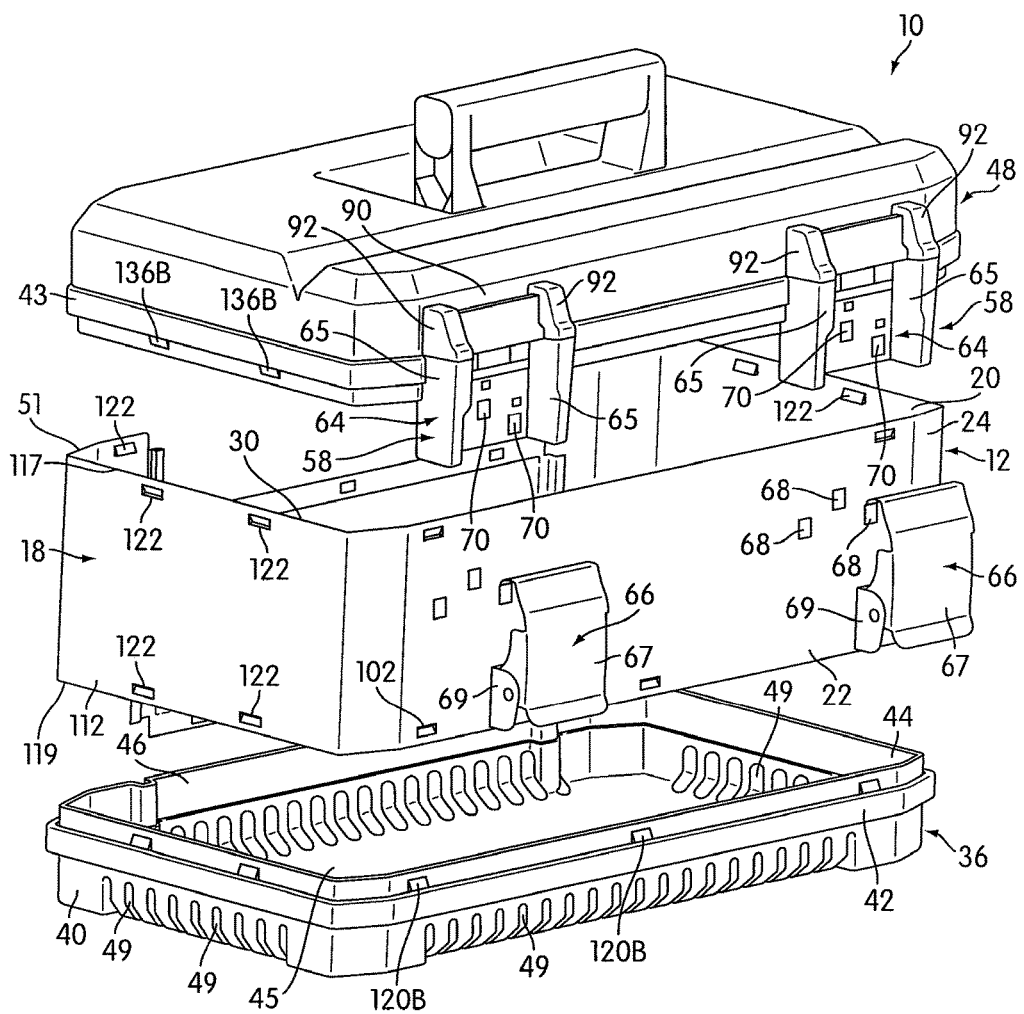
FIG. 3 is an exploded view of container from the front in accordance with an embodiment of the present invention.
Figure 4:
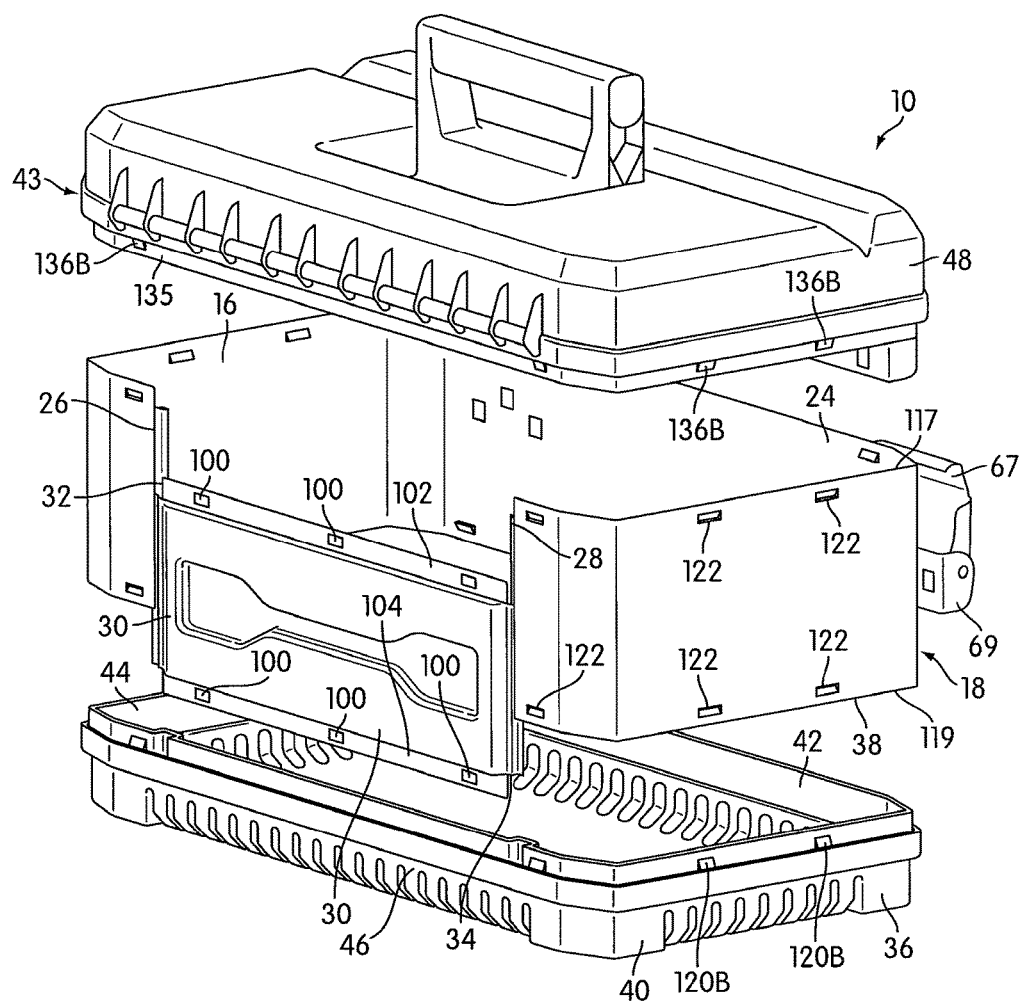
FIG. 4 is an exploded view of the container from the rear in accordance with an embodiment of the present invention.
Figure 5:
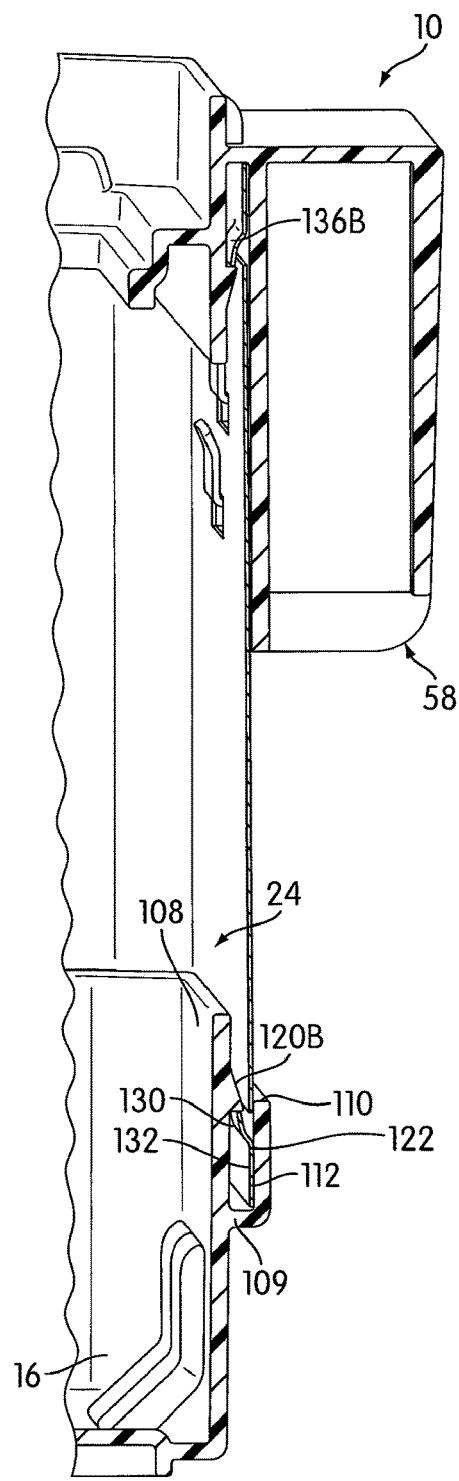
FIG. 5 is a cross sectional view of a latch arrangement and the container in accordance with an embodiment of the present invention.

FIG. 1 shows a container 10 in accordance with an embodiment of the present invention. As shown in FIG. 1, the container 10 has a container portion 12 with an opening 14 (see FIG. 2) into an interior space 16 (see FIG. 2) in which articles to be transported can be stored. The container portion 12 includes a peripheral wall 11, and a bottom portion 36. The peripheral wall 11 may have three or more sides. In the illustrated embodiment, the peripheral wall 11 has a left side 18, a right side 20, and a front side 22 formed from a continuous single sheet of stamped metal material 24. The sheet of metal material 24 has opposite first connecting end 26 (see FIG. 4) and second connecting end 28 (see FIG. 4). The peripheral wall 11 of container portion 12 also includes a plastic connector 30 that, in the illustrated embodiment, forms the majority of the rear side of the peripheral wall 11. The plastic connector 30 may be much smaller, however, such as just a narrow plastic strip, with a majority of the rear side being formed from extended portions of the sheet metal (such that connecting ends 26 and 28 are spaced closely together). In the illustrated embodiment, the plastic connector (or rear side wall 30) has a first connecting end 32 (see FIG. 4) and second connecting end 34 (see FIG. 4). The first connecting end 32 of the plastic connector 30 is connected to the first connecting end 26 of the sheet of metal 24 and the second connecting end 34 of the plastic connector 30 is connected to the second connecting end 28 of the sheet of metal 24, as shown in FIG. 4. The container 10 also has a plastic bottom 36 connected with a bottom end or lower edge 119 (see FIG. 3) of the sheet of metal 24. The plastic bottom 36 has a configuration matching that of the peripheral wall 11. In the illustrated embodiment, the plastic bottom 36 includes a left side 40, a front side 42, a right side 44, and a rear side 46 (see FIG. 4). The plastic bottom 36 may also have a bottom side 45 (see FIG. 3). Each side 40, 42, 44, and 46 may include a back wall portion 108 (see FIG. 5) and a front wall portion 110 (see FIG. 5) spaced a distance away and extending generally parallel to the back wall portion 108. As shown in FIG. 5, the back portion 108 and the front portion 110 may be connected by a bottom portion 109 and the two wall portions 108 and 110 define a receiving space 112 constructed and arranged to receive the bottom edge of sheet metal 24 and/or the plastic connector 30. As shown in FIG. 3, decorative grooves 49 may be provided on portions of the left side 40, the front side 42, the right side 44, and the rear side 46. The grooves 49 may extend partially into the bottom side 45 of the plastic bottom 36. A plastic edge portion 43 may be constructed and arranged to connect with a top end or upper edge 117 of the sheet metal 24 (see FIGS. 2 and 3).

In one embodiment, as shown in FIG. 1, the container 10, optionally taking the form of a toolbox, may optionally include a lid 48 pivotally attached to the container portion 12. The lid 48 of the container 10 may be attached to the plastic edge portion 43 of the container 10 via hinges 47 (see FIG. 2). The hinges may be made of metal, plastic, other materials, or a combination thereof. The hinges 47 may optionally be provided with dampers to facilitate the closing and opening of the lid 48. In this embodiment, the hinges 47 are connected to the lid 48 and the plastic edge portion 43. The plastic edge portion 43 is connected to the container portion 12, and thus this configuration enables the lid 48 to be pivoted relative to the container portion 12. When the lid 48 is in the closed position, the lid 48 may abut against an upper portion of the plastic edge portion 43. In other embodiments, the lid 48 may optionally be attached using pins, screws, fastenings, bolts, or any other connection mechanism as would be appreciated by one skilled in the art. In other embodiments, the lid 48 may be a snap-on lid, an accordion type lid, or lids having other configurations.

The lid 48 may be made of molded plastic, metal, wood, other materials, or any combination thereof. The bottom of the lid 48 may comprise strengthening ribs (not shown), which may be deployed crosswise with respect to one another. These strengthening ribs may be used to support the lid 48 so that heavy objects may be placed on top of the lid 48.

Figure 13:
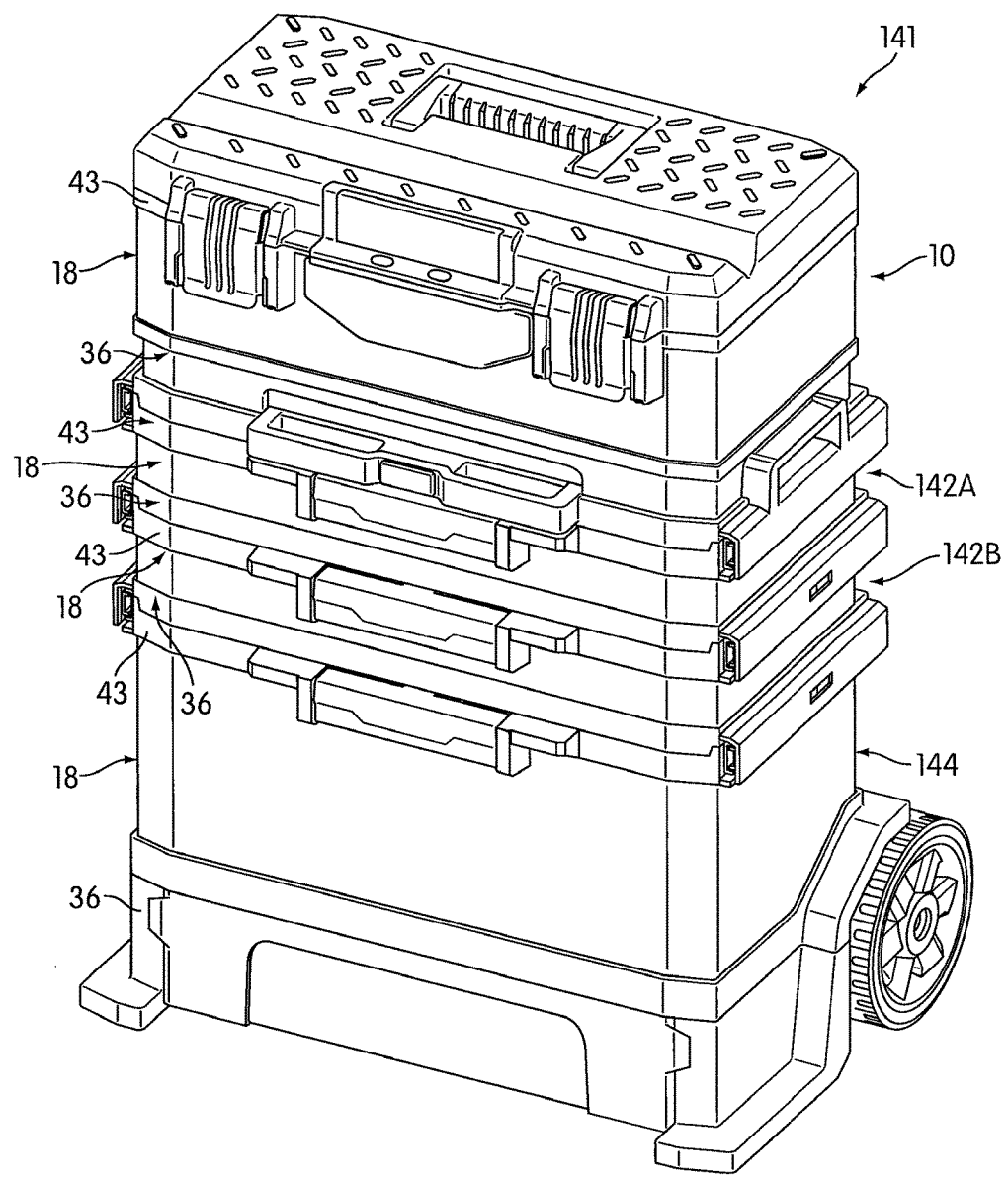
FIG. 13 is a perspective view of a rolling container assembly in accordance with an embodiment of the present invention.

The container 10 may, in one embodiment, be a stand alone container or toolbox. In another embodiment, container 10 may form the top container 10, a drawer, and/or base container within a rolling container assembly of the type illustrated in FIG. 13 and described in U.S. Pat. Nos. 6,601,930; 6,347,847; and 6,176,559, each of which is hereby incorporated by reference in its entirety.

Referring back to FIG. 1, a handle 54 may be provided on the container 10, the handle 54 being pivotable between a stored position when the handle 54 is not in use and an upright position wherein the user may grasp the handle 54 to carry the container 10. A depression 56 may be provided in the lid 48, the depression 56 being constructed and arranged to receive the handle 54 when the handle 54 is in the stored position. The handle 54 may be attached to the lid 48 using pins, fasteners, or other attachment mechanisms. In one embodiment, the handle 54 may be made of plastic and may be provided with grooves on the surface thereof to facilitate grasping of the handle 54. In other embodiments, the handle 54 may be provided with rubber or other anti-slip material on the surface thereof. The handle 54 may optionally be made of wood, metal, other materials, or a combination thereof.

In one embodiment, the container 10 may be provided with latches 58 (or a single latch) to latch the lid 48 to the plastic edge portion 43, which in turn is connected to the container portion 12. The latches 58 may be provided on the plastic edge portion 43 and the container portion 12 and may be constructed and arranged to engage with latch engaging portions 60 (see FIG. 2) on the lid 48. The latches 58 may be pulled to disengage the latch 58 from the latch engaging portions 60 of the lid 48 so that the lid 48 may opened to allow access to the contents of the container 10. The latches 58 will be described in more detail later.

Figure 2:
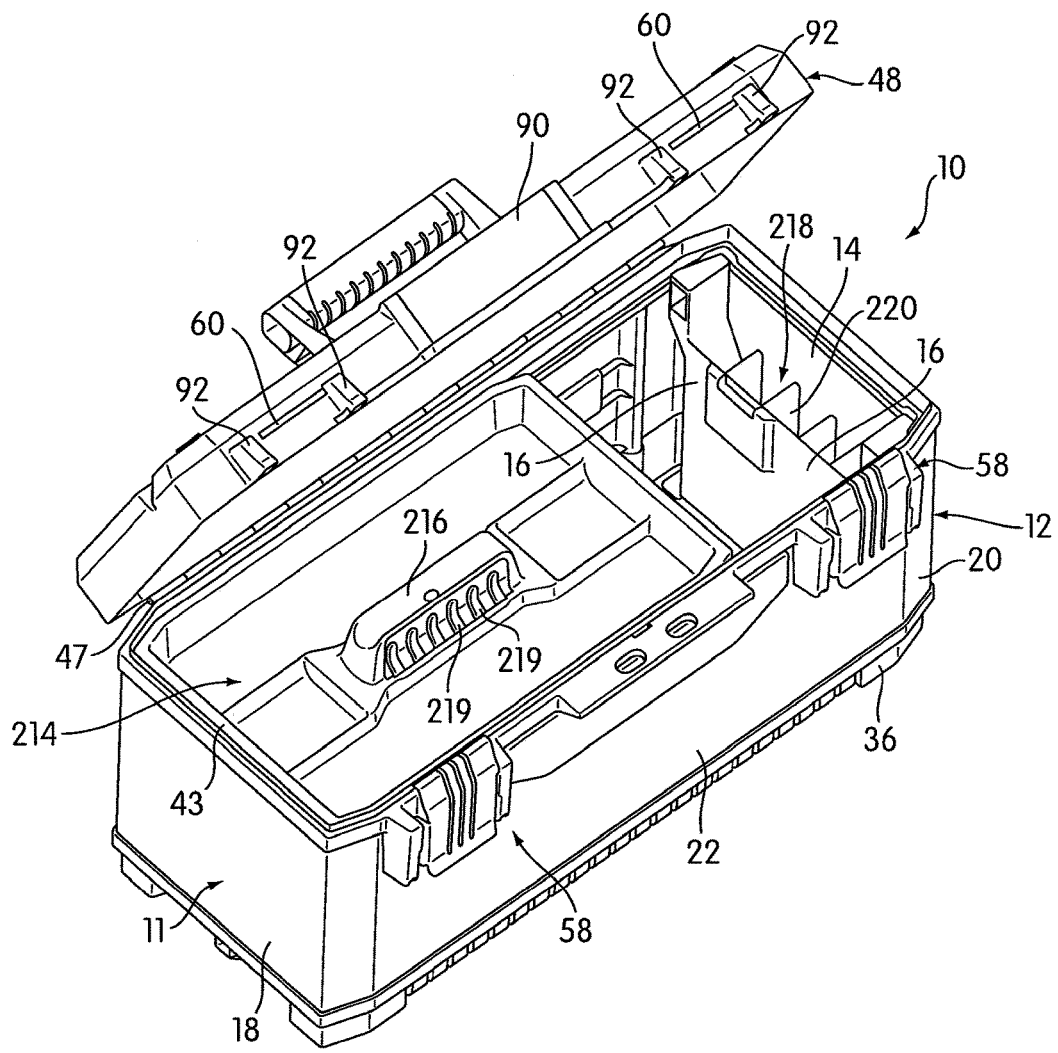
FIG. 2 is a perspective view from the top of the container in the open position in accordance with an embodiment of the present invention.

In one embodiment, as shown in FIG. 2, an insert 214 having a handle 216 is provided within the interior space 16 of the container 10. There may be grooves 219 provided near the handle 216 of the insert 214 to provide grip support when the insert 214 is to be carried separately from the removable container 16. In addition, a container 218 having partitions 220 may be provided in the removable container 16. The container 218 may be constructed and arranged to receive screwdrivers or other tools between the partitions 220. It is contemplated that the configuration of the interior space 16 may vary. In some embodiments, the insert 214 may have the same size length and width as the container 10 such that the insert 214 must be lifted to access the rest of the interior space 16 in the removable container 16. Alternatively, in some embodiments, dividers or small containers may be provided within the interior space 16 of the container 10 to form compartments within the container 10.

FIG. 3 shows an exploded view of the container 10 from the front in accordance with an embodiment of the present invention. The container 10 is assembled by connecting the lid 48 to the container portion 12. The container portion 12 is formed by connecting the rear plastic wall or plastic connector 30 to the metal sheet 24. The container portion 12 is then connected to the plastic bottom 36. Details of the connections and assembly will be described in more detail later.

In this embodiment, two latches 58 are provided on the container 10. Each latch 58 includes a latch base 64 and a pivotable latch member 66. The latch base 64 may be made of plastic, although metal, wood, other materials, or a combination thereof may be used. In one embodiment, the latch base 64 may be an extension of the upper plastic edge portion 43. That is, the latch base 64 may be integrally formed with the upper plastic edge portion 43, and the latch base 64 may be a portion of the upper plastic edge portion 43 that extends downwards towards the metal sheet 24. Each latch base 64 includes two side walls 65 extending in a direction perpendicular to the front wall 22 of the container 10. The latch member 66 may be made of metal, plastic, wood, other materials, or a combination thereof. In other embodiments, the lid 48 may be latched to the container portion 12 using buckles, locks, hooks, or other locking/latching mechanisms.

Figure 6:
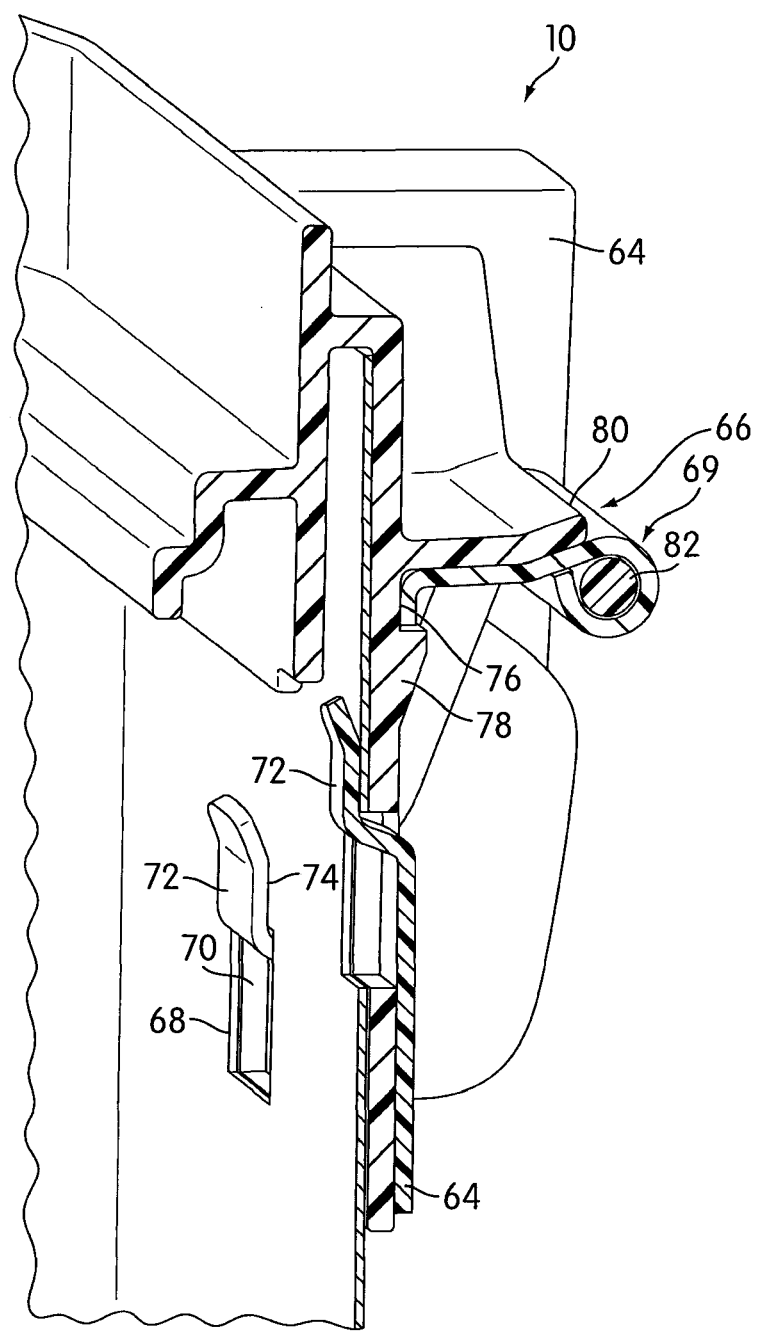
FIG. 6 is cross sectional view of the latch arrangement and portion of the container in accordance with an embodiment of the present invention.

In the embodiment shown in FIG. 3, recesses or openings 68 (six in this embodiment) are provided on the front side 22 of the sheet metal 24, wherein the openings 68 are constructed and arranged to receive portions of the latch member 66 to connect the latch member 66 to the container portion 12. Similarly, openings 70 are provided on each latch base 64 (six openings 70 in this embodiment), wherein the openings 70 are constructed and arranged to receive portions of the latch member 66 to connect the latch member 66 to the latch base 64. Specifically, in the embodiment shown in FIG. 3, the latch member 66 includes a cover portion 67 and a base portion 69. As shown in FIG. 6, the base portion 69 may include protrusions 72, or hooks, that are constructed and arranged to be inserted into the openings 68 and 70 so as to retain the latch member 66 against the latch base 64 and the container portion 12. As such, an inner surface 74 of each protrusion 72 may abut against an inner surface of the sheet metal 24 when the protrusions 72 are inserted into the openings 68 and 70.

In one embodiment, as shown in FIG. 6, the latch member 66 may also be attached to the latch base 64 via snap-fit connections. That is, a connecting portion 76 of the latch member 66 may be inserted into a latch cover receiving portion 78 of the latch base 64 so as to connect the latch member 66 with the latch base 64. As such, when the latch member 66 is connected with the latch base 64, any one of the connecting portion 76 of the latch member 66 and the latch cover receiving portion 78 of the latch base 64 may include a protrusion (not shown) that is engaged with a protrusion receiving member (not shown) located on the other of the connecting portion 76 and the latch cover receiving portion 78.

As shown in FIG. 6, the latch member 66 may include an extension portion 80 extending from the connecting portion 76, wherein the extension portion 80 includes an opening 82 on the end opposite the connecting portion 76. The opening 82 may be constructed and arranged to receive a cover connecting structure 84 (see FIG. 7), in this embodiment taking the form of a metal ring. The cover connecting structure 84 may be connected to the cover portion 67 so as to enable the cover portion 67 to pivot relative to the base portion 69. As such, in some embodiments, the base portion 69 is affixed to the latch base 64, and the cover portion 67 is movable relative to the base portion 69 and the latch base 64 when the cover portion 67 is moved between the engaged position to latch the lid 48 to the container portion 12 and the disengaged position wherein the lid 48 may be pivoted to the open position.

Figure 7:
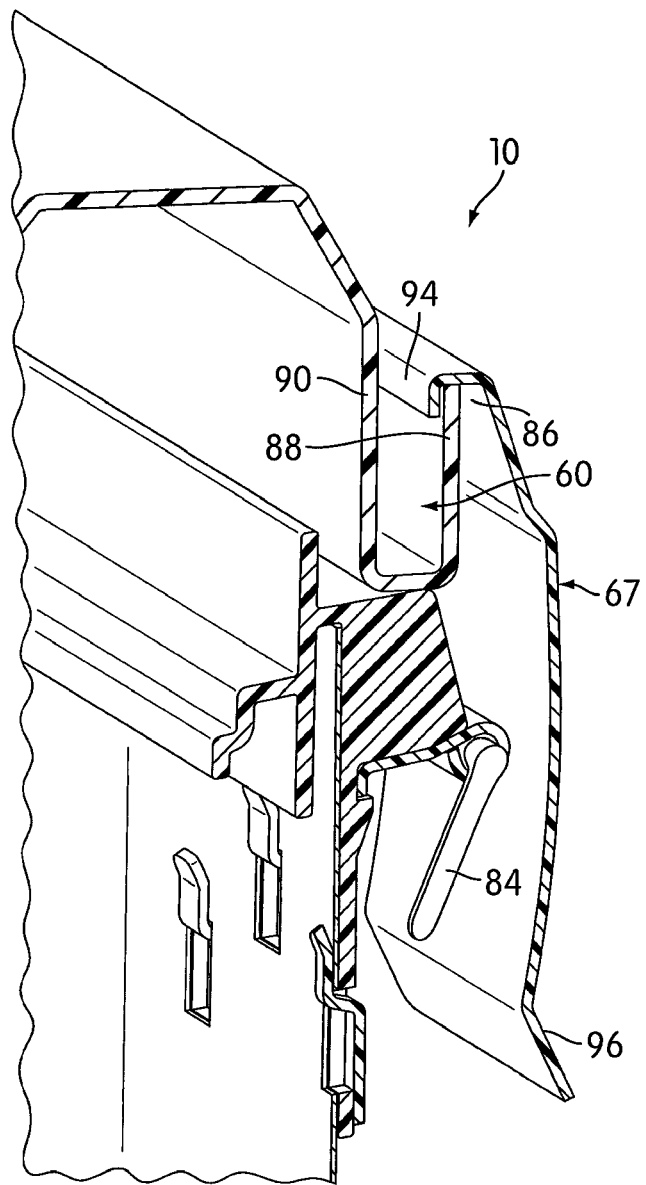
FIG. 7 is cross sectional view of the latch arrangement and portion of the container in accordance with an embodiment of the present invention.

As shown in FIG. 7, the latch engaging portion 60 includes a latch retaining wall 88 spaced a predetermined distance from and extending parallel to a front wall 90 of the lid 48. The latch retaining wall 88 extends between and is used to connect two side walls 92 (see FIG. 3) of the latch engaging portion 60, wherein the side walls 92 extend perpendicularly from the front wall 90 of the lid 48. When the lid 48 is in the closed position, the side walls 92 align with the side walls 65 of the latch base 64, as shown in FIG. 3. The latch cover portion 67 includes a retaining portion 94 constructed and arranged to engage with the latch retaining wall 88. The retaining portion 94 may be part of a hook-like configuration of one end of the latch cover portion 67, as shown in FIG. 7. When the latch cover portion 67 is in the engaged position, the retaining wall 88 of the latch engaging portion 60 engages with the retaining portion 94 and prevents the movement of the latch cover portion 67. As such, the cover 48 may be latched to the container portion 12 using the latch engaging portion 60 and the latch 58.

To unlatch the latch 58 from the latch engaging portion 60, the user may simply pull a tab 96 on the latch cover portion 67 in the upward direction and thus pivot the latch cover portion 67 so that the retaining portion 94 is no longer disposed against the latch retaining wall 88. The latch cover portion 67 may then be pivoted relative to the base portion 64 via the connecting structure 84. To latch the latch 58 to the latch engaging portion 60, the user may simply pivot the latch cover portion 67 upwardly using the tab 96 so that the retaining portion 94 is aligned over the latch retaining wall 88. The user may then lower the cover portion 67 and push against the tab 96 or any other portion of the cover 67 so that the latch retaining wall 88 is engaged with the retaining portion 94, thereby latching the latch 58 to the latch engaging portion 60, as shown in FIG. 7.

Figure 8:
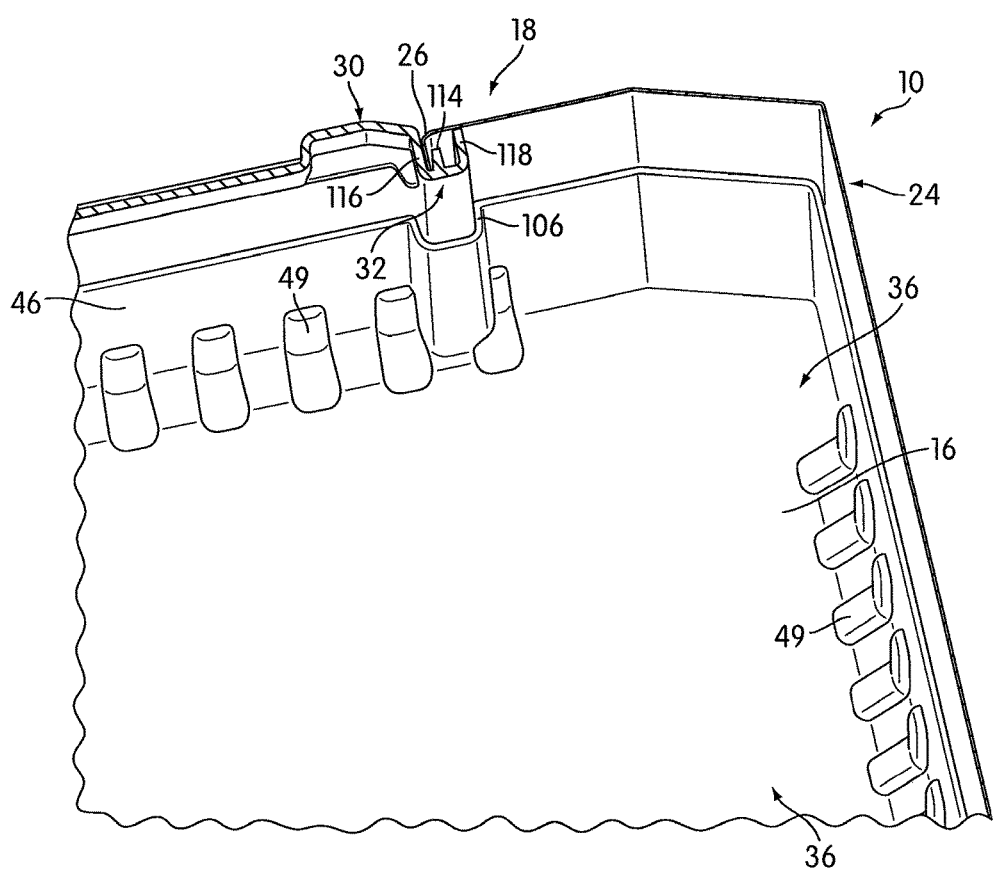
FIG. 8 is a cross sectional view of the back wall connected to a plastic bottom and a sheet of metal in accordance with an embodiment of the present invention.

FIG. 8 shows the bottom portion of the plastic connector 30, forming the majority of the rear side, connected to the sheet metal 24 and to the back side 46 of the plastic bottom 36. In this embodiment, the sheet metal 24 has the first connecting end 26, taking the form of a lip extending generally inwards towards the interior space 16 of the container 10. The plastic bottom portion 36 includes a receiving groove 106 that may be defined by a portion of the rear side 46 of the plastic bottom portion 36 that extends generally inwards towards the interior space 16 of the container 10. The receiving groove 106 may be constructed and arranged to receive the first connecting end 26 of the sheet metal 24 and the first connecting end 32 of the plastic connector 30. The plastic connector 30 has the first connecting end 32, having a U-shaped cross-section in this embodiment. The first connecting end 32 may include a first side 116 and a second side 118 opposite the first side 116, and a partition 114 between the first and second sides 116, 118. In this embodiment, when the first connecting end 32 of the plastic connector 30 is connected to the first connecting end 26 of the sheet metal 24, the first connecting end 26, which may take the form of a lip, is inserted between the first side 116 and the partition 114 of the first connecting end 32 of the plastic connector 30. Thus, the placement of the first connecting end 26 of the sheet metal between the first side 116 and the partition 114 of the first connecting end 32 of the plastic connector 30 enables the sheet metal 24 to be connected to the plastic connector 30. In this configuration, the first connecting end 26 of the sheet metal 24 and the first connecting end 32 of the plastic connector 30 are inserted into the receiving groove 106 of the plastic bottom 36. The receiving groove 106 thus reinforces the connection between the sheet metal 24 and the plastic connector 30, and also facilitates the connection among the plastic connector 30, the sheet metal 24, and the plastic bottom 36. The second connecting end 34 of the plastic connector 30 and the second connecting end 28 of the sheet metal 24 may be constructed in a similar manner as the first connecting end 32 of the plastic connector 30 and the first connecting end 26 of the sheet metal 24, respectively. The second connecting end 34, the second connecting end 28, and the plastic bottom 36 may also be connected in a similar manner as described above with respect to the first connecting end 26 of the sheet metal 24, the first connecting end 32 of the plastic connector 30, and the plastic bottom 36.

Figure 9:
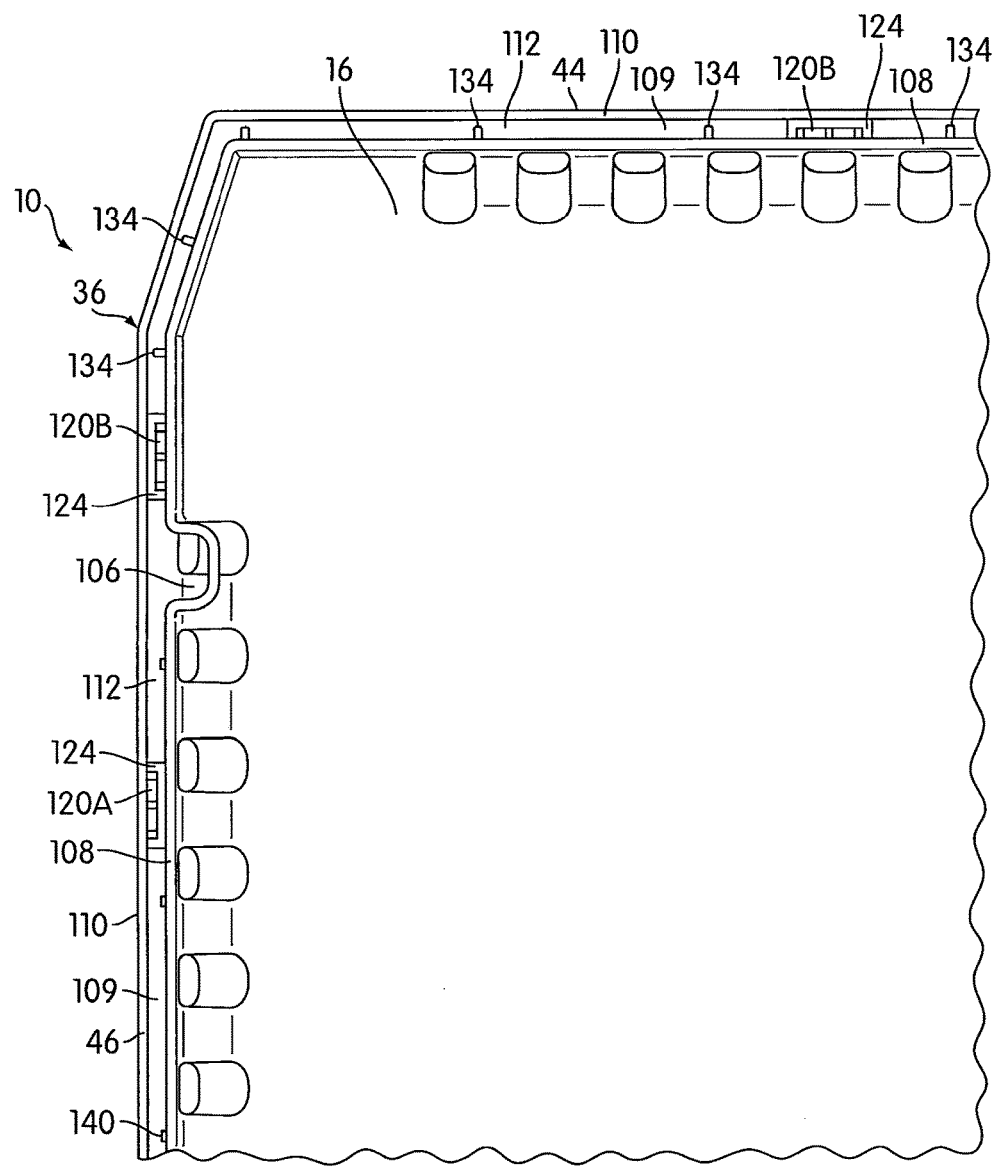
FIG. 9 is a cross sectional view of the plastic bottom in accordance with an embodiment.
Figure 10A:
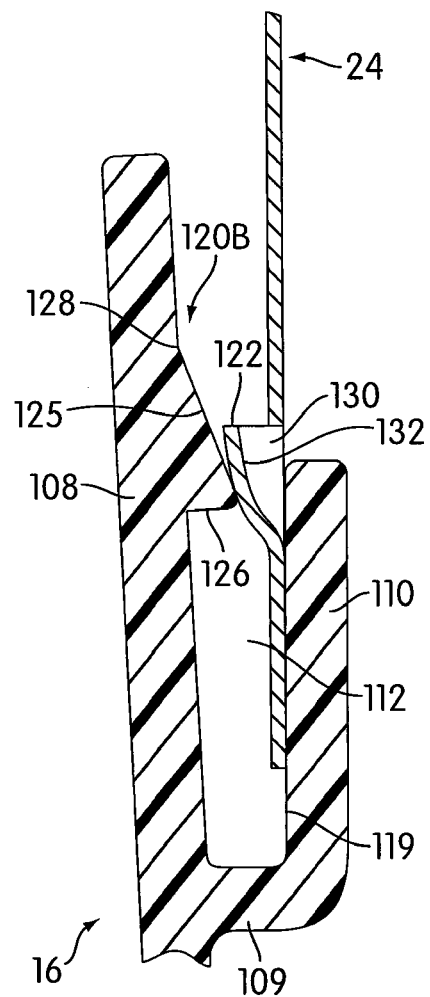
FIGS. 10A-10B are cross sectional views illustrating the details of the sheet of metal being connected to the plastic bottom.
Figure 10B:
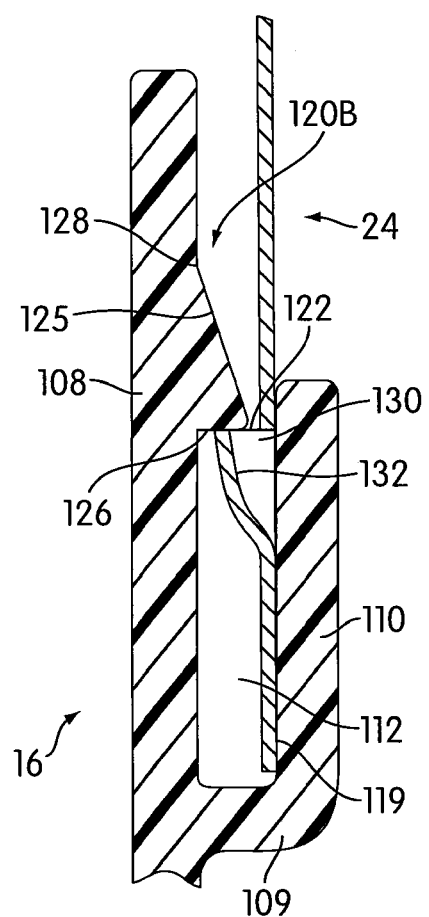

FIG. 9 shows the plastic bottom 36 in more detail. As mentioned above, the back portion 108, bottom portion 109, and front portion 110 of each side 40, 42, 44, and 46 define a receiving space 112 constructed and arranged to receive the sheet metal 24 and/or the plastic connector 30. A plurality of protrusions or projections 120A, 120B are provided within the receiving space 112. In this embodiment, the protrusions 120A are connected to the front wall 110 of the rear side 46 of the plastic bottom 36 and are constructed and arranged to engage with openings 100 provided on the plastic connector 30 (see FIG. 4). The protrusions or projections 120B are connected to the back portion 108 of the left side 40, the front side 42, the right side 44, and the rear side 46 of the plastic bottom 36, and are constructed and arranged to engage with louvers 122 (see FIG. 4) located near the lower edge 119 of the sheet metal 24. The louvers 122, unlike openings in the sheet metal 24, require only a deformation of the metal material, and not removal of material. Although recesses 130 may be formed in the sheet metal 24 during the formation of the louvers 122, the recesses 130 are located opposite the louvers 122 and are not used to engage with the projections 120B. Rather, each louver 122 provides an engaging edge 123 (see FIG. 10B) that bitingly engages the bottom portion 126 (see FIG. 10B) of the projections 120B. In other words, when the sheet metal 24 is engaged with the plastic bottom 36, the protrusions 120B do not extend into the recesses 130 in the sheet metal 24, but rather remain captured by the engaging edges 123 provided by the louvers 122, as shown in FIG. 10B. Alternatively or additionally, projections may be provided near the lower edge 119 of the sheet metal so that the projections may engage with the protrusions or projections 120B. As shown in FIG. 9, the rear side 46 of the plastic bottom 36 may have both protrusions 120A and 120B for connecting the plastic connector 30 and the sheet metal 24, respectively. The protrusions 120B may have a sloped surface 125 that extends downwards with a bottom portion 126 that extends further from the portion 108 or 110 to which it is attached than a top portion 128 of the protrusions 120B, as shown in FIG. 10B. The protrusions 120A and 120B may have the same construction but are labeled A and B to differentiate between them.

Referring back to FIG. 9, openings 124 may be provided on the bottom portion 109 underneath the protrusions 120A and 120B. In some embodiments, a plurality of ridges or pushers 134 may be provided on the back portion 108 of the left side 40, the front side 42, the right side 44, and the rear side 46 of the plastic bottom 36. The plurality of ridges or pushers 134 may be placed near the protrusions 120B. These ridges or pushers 134 may be constructed and arranged to push the sheet metal 24 against the front portion 110 when the louvers 122 of the sheet metal 24 are engaged with the protrusions 120B of the plastic bottom 36. Thus, in some embodiments with such configuration, the sheet metal 24 may not be in contact with the back portion 108 of the left side 40, the front side 42, the right side 44, and the rear side 46 of the plastic bottom 36 when the sheet metal 24 is connected to the plastic bottom 36.

As shown in FIGS. 5 and 10, each louver 122 of the sheet metal 24 may be upward facing with a slanted surface 132. The slanted surface 132 may slant in a direction towards the interior space 16 of the container 10. The location and construction of the protrusions 120A, 120B, openings 100, and louvers 122 may vary in different embodiments, and the description above is not intended to be limiting. Although the louvers 122 near the lower edge 119 of the sheet metal 24 are shown to be upward facing (see FIGS. 5 and 11), the louvers 122 near the upper edge 117 of the sheet metal 24 may be downward facing, or in other words, a mirror image of the louvers 122 near the lower edge 119.

In one embodiment, the sheet metal 24 may be connected to the plastic bottom 36 using the louvers 122 and the protrusions 120B via snap-fit connections as follows. To connect the sheet metal 24 to the plastic bottom 36, the lower edge 119 of the sheet metal 24 may be aligned with the receiving space 112 of the plastic bottom 36 so that the louvers 122 and the protrusions 120B are also aligned. The lower edge 119 may be pushed towards the receiving space 112 of the plastic bottom 36 until the louvers 122 come into contact with the protrusions 120B. As the lower edge 119 of the sheet metal 24 is pushed into the receiving space 112 of the plastic bottom 36, the slanted surface 132 of the louvers 122 contacts the sloped surface 125 of the protrusion 120B (see FIG. 10A). During this process, one or both of back portion 108 and front portion 110 may have resilient properties that enable the back portion 108 and/or the front portion 110 to be pushed away from each other to accommodate the contact between the sloped surface 125 and the protrusion 120B. For example, the slanted surface 132 of the louver 122 may push against the protrusion 120B with sufficient force such that the protrusion 120B and the back portion 108 to which the protrusion 120B is attached may be pushed towards the interior space 16 of the container 10. Alternatively or additionally, the front portion 110 may be pushed in a direction away from the protrusion 120B. This may enable the slanted surface 132 of the louver 122 to slide further down against the sloped surface 125 of the protrusion 120B. The back portion 108 or the front portion 110 may be pushed the furthest distance away from each other when the slanted surface 132 of the louver 122 near the edge 123 is in contact with the area of the sloped surface 125 of the protrusion 120B near the bottom portion 126. The louver 122 may be pushed further into the receiving space 112, whereupon the slanted surface 132 of the louver 122 and the sloped surface 125 of the protrusion 120B are no longer in contact, and the louver 122 snaps into place underneath the protrusion 120B in the engaging position (see FIG. 10B). The back portion 108 and/or the front portion 110 may then snap back into their default position towards each other. Specifically, in this embodiment, when the louver 122 and the protrusion 120B are in the engaging position, the edge 123 of the louver 122 contacts the bottom portion 126 of the protrusion 120B. In this position, the bottom portion 126 of the protrusion 120B prevents the upward movement of the louver 122 and thus retains the louver 122 and the lower edge 119 of the sheet metal 24 in the receiving space 112.

The plastic edge portion 43 may also include a back portion 145 and a front portion 147 (see FIG. 11) constructed and arranged in a similar manner as the back portion 108 and the front portion 110 of the plastic bottom 36. The front portion and back portion of the plastic edge portion 43 may also define a receiving space 149 that is constructed and arranged in a similar manner as the receiving space 112 of the plastic bottom 36. The plastic edge portion 43 may also have protrusions 136A (see FIGS. 11) and 136B constructed and arranged to engage with the plastic connector 30 and the sheet metal 24, respectively. The protrusions 136B may be connected to louvers 122 located near the upper edge 117 of the sheet metal 24 in a similar manner as described above with respect to protrusions 120B and the louvers 122 located near the lower edge 119 of the sheet metal 24. The protrusions 136A may have similar construction as protrusions 120A, described above. Although the protrusions 136A, 136B may have similar construction as protrusions 120A, 120B, the protrusions 136A, 136B may be a mirror image of protrusions 120A, 120B. That is, an upper portion 137 of protrusions 136A, 136B corresponding to the bottom portion 126 of protrusions 120A, 120B may be upward facing (see FIG. 11 with respect to protrusion 136A) rather than downward facing as shown in FIG. 10.

Referring back to FIG. 4, the plastic connector 30 has the plurality of openings 100 provided on an upper portion 102 and a lower portion 104 thereof. The openings 100 may be constructed and arranged to connect the plastic connector 30 to the plastic edge portion 43 and to the plastic bottom 36. The openings 100 near the upper portion 102 are constructed and arranged to engage with protrusions 136A on the plastic edge portion 43, and the openings 100 near the lower portion 104 are constructed and arranged to engage with protrusions 120A on the plastic bottom 36. In some embodiments, the openings 100 are rectangular cutouts in the upper portion 102 and lower portion 104 of the plastic connector 30.

Figure 11:
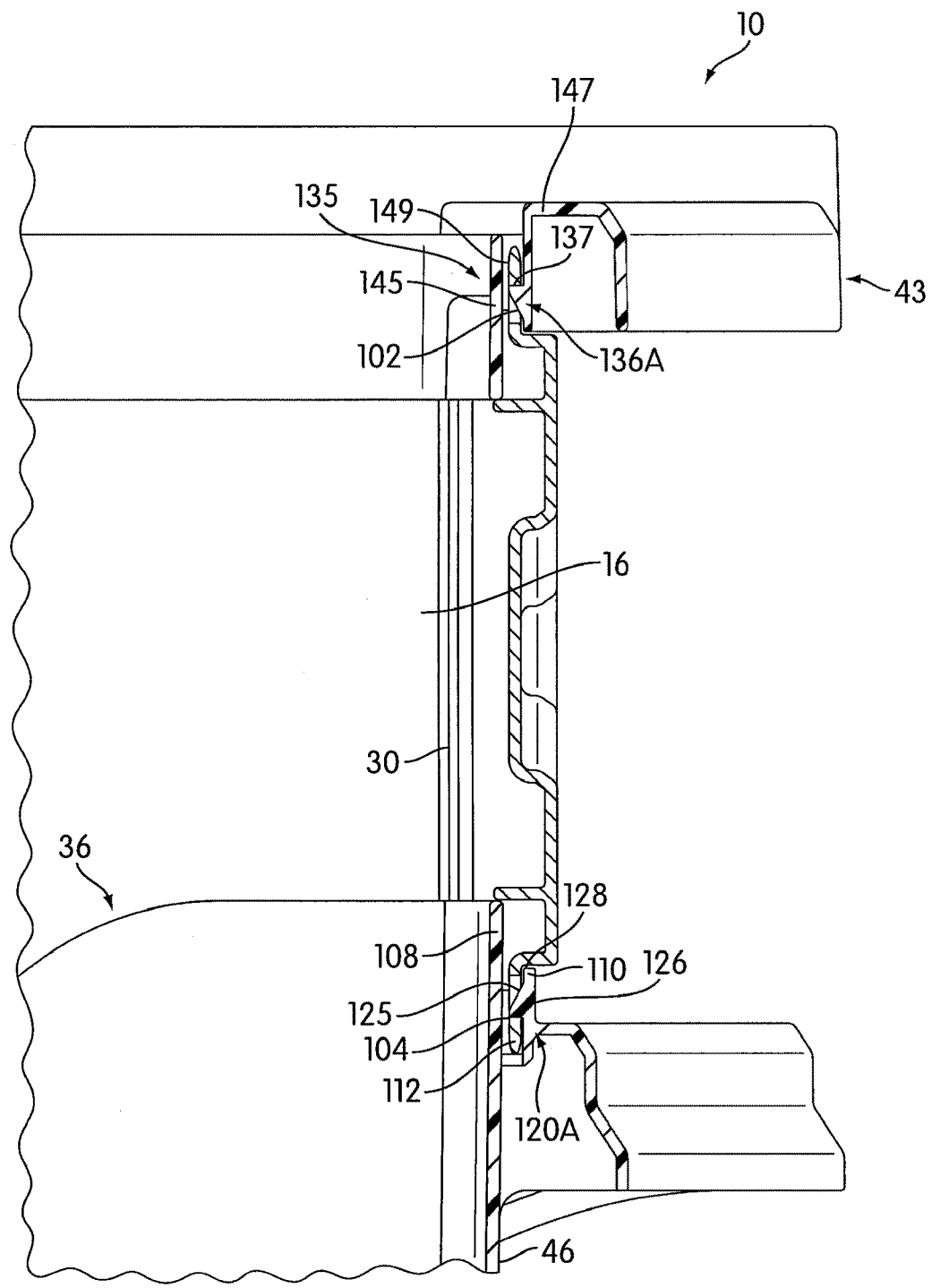
FIG. 11 is cross sectional view of the plastic rear wall connected to the rest of the container in accordance with an embodiment of the present invention.

FIG. 11 shows the plastic connector 30 connected to the plastic edge portion 43 and the plastic bottom 36. In this embodiment, the protrusions 120A are attached to the front portion 110 of the rear side 46 of the plastic bottom 36. A plurality of ridges 140 (see FIG. 9) may optionally be provided on the back portion 108 of the rear side 46 of the plastic bottom 36. The ridges 140 may be constructed and arranged to prevent the plastic rear side from coming into contact with the back portion 108 of the plastic bottom 36 when the plastic connector 30 is engaged with the plastic bottom 36. The ridges 140 may also be constructed and arranged to push against the plastic connector 30 so that the openings 100 are pushed towards the protrusions 120A.

To engage the openings 100 of the plastic connector 30 with the protrusions 120A, the lower portion 104 of the plastic connector 30 may be aligned with the receiving space 112 of the plastic bottom 36 so that the openings 100 are aligned with the protrusions 120A. Each opening 100 may then be pushed towards a protrusion 120A so that an edge of the lower portion 104 of the plastic connector 30 pushes against the sloped surface 125 of the protrusion 120A, whereupon the protrusion 120A snaps into the opening 100 and thus retains the protrusion 120A within the opening 100, as shown in FIG. 11. As a result, the bottom portion 126 of each protrusion 120A may abut against a lower periphery of each opening 100 and thus prevent the removal of the protrusion 120A from the opening 100.

In one embodiment, the protrusions 136A are located on an extended portion 135 of the plastic edge portion 43 and are facing into the interior space 16 of the container 10 (see FIGS. 5 and 11). The extended portion 135 may include the back portion 145 and the front portion 147 that is spaced a distance away from the back portion 147 to define the receiving space 149. The upper portion 102 of the plastic connector 30 may be received in the receiving space 149 when the plastic connector 30 is connected to the plastic edge portion 43. In the embodiment shown in FIG. 11, the protrusions 136A are attached to the front portion 147 of the plastic edge portion 43. The protrusions 136B may be attached to the back portion 145 of the plastic edge portion 43. A plurality of ridges (not shown) that are similar to the ridges 140 of the plastic connector 30 may be provided on the back portion 145 of the plastic edge portion 43.

The protrusions 136A of the plastic edge portion 43 may be engaged with the openings 100 located on the upper portion 102 of the plastic connector 30 in a similar manner as described above with respect to the protrusions 120A and the plastic connector 30. However, in contrast to the protrusions 120A, when the protrusions 136A are received in the openings 100, the upper portion 137 of each protrusion 126A may abut against an upper periphery of each opening 100, thus preventing the removal of the protrusion 126 from the opening 100.

Figure 12:
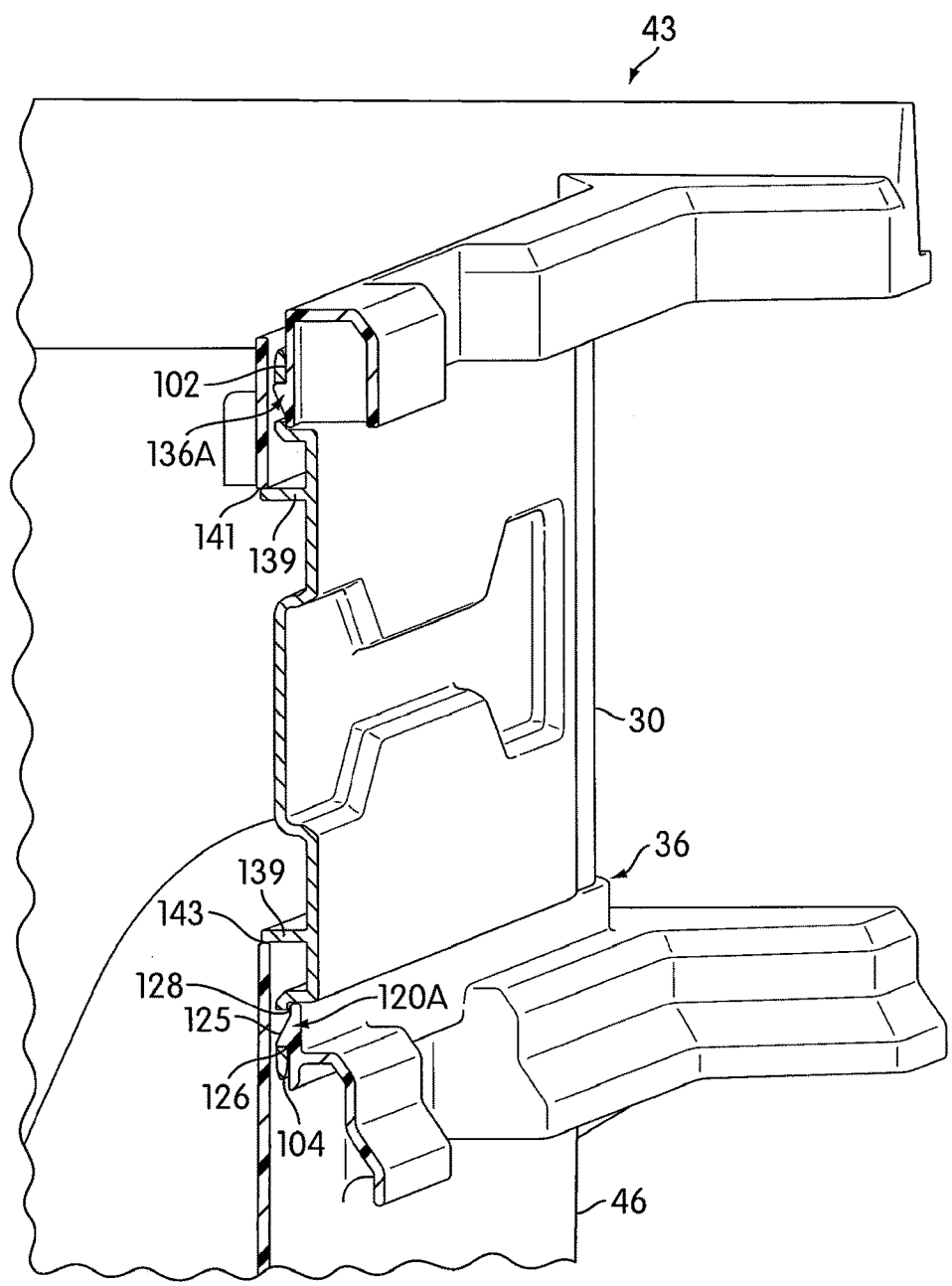
FIG. 12 is a cross sectional view of the plastic rear wall connected to the rest of the container in accordance with an embodiment of the present invention.

FIG. 12 shows another view of the plastic connector 30 connected to the plastic edge portion 43 and the plastic bottom 36. In this embodiment, the plastic connector 30 includes ledges 139 provided near the upper portion 102 and the lower portion 104. When the plastic connector 30 is connected to the plastic edge portion 43, a portion of the ledge 139 near the upper portion 102 of the plastic connector 30 may abut against a lower edge 141 of the plastic edge portion 43. Similarly, when the plastic connector 30 is connected to the plastic bottom 36, a portion of the ledge 139 near the lower portion 104 of the plastic connector 30 may abut against an upper edge 143 of the plastic bottom 36.

Although the construction of a toolbox is described above, it is contemplated that any or all combinations of the materials described above, such as the sheet metal 24, the plastic connector 30, the plastic bottom 36, and the plastic edge portion 43, may be used in the construction of drawers or other containers having a variety of shapes, and with or without lids. As such, any combination of the materials used, such as the sheet metal 24, the plastic connector 30, the plastic bottom 36, and the plastic edge portion 43 may be connected in similar manner as described above. For example, in a rolling container assembly 141 shown in FIG. 13, each of slideable drawers 142A, 142B and a bottom bin 144 may be made of the sheet metal 24, the plastic connector 30 (not shown in this figure), the plastic bottom 36, and the plastic edge portion 43. The connections among the aforementioned materials may be made in similar manner as described above with respect to removable container 10. The rolling container assembly 11 is described in U.S. patent application Ser. No. 12/467,139, published as U.S. patent application Publication No. 2010/0290877, which is fully incorporated herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

What is claimed is:
1. A container comprising:
a peripheral wall comprising a first side, a second side, and a third side formed from a single sheet of metal material, the sheet of metal material having opposite first and second connecting ends, and a plastic connector being connected to the first connecting end and the second connecting end of the sheet metal and formed on a fourth side of the peripheral wall to thus form a closed peripheral wall;
a plastic edge portion connected with a top end of the closed peripheral wall by top metal to plastic fastener-free connections at a top end of the sheet metal material and by top plastic to plastic fastener-free connections at a top end of the plastic connector;
a plastic bottom connected with a bottom end of the closed peripheral wall,
the closed peripheral wall, the plastic edge portion and the plastic bottom comprising a container portion; and
a lid for closing and opening a top of the container portion, the lid being constructed and arranged to be pivotally attached to the plastic edge portion,
wherein the sheet metal material, the plastic connector and the plastic bottom have integrally formed connector structures that provide fastener-free connections between the plastic connector and the plastic bottom, and between the sheet metal material and the plastic bottom;
wherein the closed peripheral wall formed by the sheet metal material and the plastic connector has the bottom end thereof connected to the plastic bottom by metal to plastic fastener-free connections at the bottom end of the sheet metal material and plastic to plastic fastener-free connections at the bottom end of the plastic connector; and
a carrying handle connected to the lid and enabling the container to be lifted and carried thereby, wherein the top plastic to plastic fastener free connection at the top end of the plastic connector bears at least some of the weight of the container portion and any contents thereof when the container is carried by the handle.

2. The container of claim 1, wherein the plastic connector comprises a panel occupying a majority of the fourth side.

3. The container of claim 1, further comprising at least one latch constructed to secure the lid in covering relation with respect to the peripheral wall.

4. The container of claim 1, wherein the plastic edge portion comprises protrusions received within openings or recesses in the top end of the sheet metal.

5. The container of claim 1, wherein the plastic bottom comprises protrusions received within openings or recesses in the bottom end of the peripheral wall.

6. The container of claim 1, wherein the first and second connecting ends of the sheet metal comprise openings or recesses, and the plastic connector comprises projections that are received in the openings or recesses.

7. The container of claim 1, wherein the top metal to plastic fastener-free connections comprise protrusions on the plastic edge portion constructed and arranged to engage with louvers on the top end of the sheet metal material.

8. The container of claim 1, wherein the plastic bottom comprises protrusions constructed and arranged to engage with louvers on the bottom end of the peripheral wall.

9. The container of claim 1, wherein the first and second connecting ends of the sheet metal comprises louvers, and the plastic connector comprises projections that engage with the louvers.

10. The container of claim 1, wherein the container is a slideable drawer.

11. The container of claim 1, wherein the connections between the sheet of metal and the plastic connector, as well as between the sheet metal and plastic bottom comprise integrally formed projections on the plastic connector and plastic bottom, and openings or recesses formed in the sheet of metal.

12. The container of claim 11, wherein the connections between the sheet of metal and the plastic connector, as well as between the sheet of metal and the plastic bottom comprises no rivets or other separate fasteners.

13. An apparatus for transporting articles between working locations, comprising:
a base container having an interior space in which articles to be transported can be stored;
one or more rotatable ground engaging wheels mounted toward the bottom of the apparatus for rotation about an axis to provide rolling support for the apparatus;
at least one removable container having (i) a container portion with an interior space in which articles to be transported can be stored, (ii) a lid pivotally connected to the container portion; (iii) at least one latch constructed to secure the lid in covering relation with respect to the container portion, and (iv) a carrying handle attached to the lid and that is manually graspable to enable carriage of the removable container; and
a manually engageable pulling handle, the pulling handle and the one or more ground engaging wheels being arranged to enable a user to manually pull the pulling handle generally rearwardly so as to tilt the apparatus rearwardly to a tilted rolling movement position, thereby enabling the user to roll the apparatus to a desired location by pushing or pulling the pulling handle in a desired direction;
wherein the removable container is constructed and arranged to be latched above the base container, and wherein the container portion thereof comprises:
a peripheral wall comprising a first side, a second side, and a third side formed from a single sheet of metal material, the sheet of metal material having opposite first and second connecting ends, and a plastic connector being connected to the first connecting end and the second connecting end of the sheet metal and formed on a fourth side of the peripheral wall to thus form a closed peripheral wall;
a plastic edge portion connected with a top end of the closed peripheral wall by top metal to plastic fastener-free connections at a top end of the sheet metal material and by top plastic to plastic fastener-free connections at a top end of the plastic connector;
a plastic bottom connected with a bottom end of the closed peripheral wall;
the lid for closing and opening a top of the container portion, the lid being constructed and arranged to be pivotally attached to the plastic edge portion,
wherein the sheet metal material, the plastic connector and the plastic bottom have integrally formed connector structures that provide fastener-free connections between the plastic connector and the plastic bottom, and between the sheet metal material and the plastic bottom;
wherein the closed peripheral wall formed by the sheet metal material and the plastic connector has the bottom end thereof connected to the plastic bottom by metal to plastic fastener-free connections at the bottom end of the sheet metal material and plastic to plastic fastener-free connections at the bottom end of the plastic connector; and
wherein the carrying handle enables the removable container to be lifted and carried thereby, wherein the top plastic to plastic fastener free connection at the top end of the plastic connector bears at least some of the weight of the container portion and any contents thereof when the removable container is carried by the carrying handle.

14. The apparatus of claim 13, wherein the base container comprises:
   a container portion with an opening into an interior space in which articles to be transported can be stored, the container portion comprising:
      a peripheral wall comprising a first side, a second side, and a third side formed from a single sheet of metal material, the sheet of metal material having opposite first and second connecting ends; and a plastic connector being connected to the first connecting end and the second connecting end of the sheet metal and formed on a fourth side of the peripheral wall to thus form a closed peripheral wall;
      a plastic edge portion connected with a top end of the closed peripheral wall by top metal to plastic fastener-free connections at a top end of the sheet metal material and by top plastic to plastic fastener-free connections at a top end of the plastic connector;
      a plastic bottom connected with a bottom end of the closed peripheral wall,
      the closed peripheral wall, the plastic edge portion and the plastic bottom comprising a container portion;
      a lid for closing and opening a top of the container portion, the lid being constructed and arranged to be pivotally attached to the plastic edge portion,
      wherein the sheet metal material, the plastic connector and the plastic bottom have integrally formed connector structures that provide fastener-free connections between the plastic connector and the plastic bottom, and between the sheet metal material and the plastic bottom;
      wherein the closed peripheral wall formed by the sheet metal material and the plastic connector has the bottom end thereof connected to the plastic bottom by metal to plastic fastener-free connections at the bottom end of the sheet metal material and plastic to plastic fastener-free connections at the bottom end of the plastic connector.

15. The apparatus of claim 13, further comprising a slideable drawer.

16. The apparatus of claim 15, wherein the slideable drawer comprises:
   a container portion with an opening into an interior space in which articles to be transported can be stored, the container portion comprising:
      a peripheral wall comprising a first side, a second side, and a third side formed from a single sheet of metal material, the sheet of metal material having opposite first and second connecting ends, and a plastic connector being connected to the first connecting end and the second connecting end of the sheet metal and formed on a fourth side of the peripheral wall to thus form a closed peripheral wall;
      a plastic edge portion connected with a top end of the closed peripheral wall by top metal to plastic fastener-free connections at a top end of the sheet metal material and by top plastic to plastic fastener-free connections at a top end of the plastic connector; and
      a plastic bottom connected with a bottom end of the closed peripheral wall,
      the closed peripheral wall, the plastic edge portion and the plastic bottom comprising the container portion;
      wherein the sheet metal material, the plastic connector and the plastic bottom have integrally formed connector structures that provide fastener-free connections between the plastic connector and the plastic bottom, and between the sheet metal material and the plastic bottom, and
      wherein the closed peripheral wall formed by the sheet metal material and the plastic connector has the bottom end thereof connected to the plastic bottom by metal to plastic fastener-free connections at the bottom end of the sheet metal material and plastic to plastic fastener-free connections at the bottom end of the plastic connector.

17. A container comprising:
   a peripheral wall comprising a first side, a second side, and a third side formed from a single sheet of metal material, the sheet of metal material having opposite first and second connecting ends, and a plastic connector being connected to the first connecting end and the second connecting end of the sheet metal and formed on a fourth side of the peripheral wall to thus form a closed peripheral wall;
   a plastic edge portion connected to a top end of the closed peripheral wall by top metal to plastic fastener-free connections at a top end of the sheet metal material and by top plastic to plastic fastener-free connections at a top end of the plastic connector;
   a plastic bottom connected with a bottom end of the closed peripheral wall,
   wherein the closed peripheral wall, the plastic edge portion and the plastic bottom comprising a container portion; and
   a lid for closing and opening a top of the container portion, the lid being constructed and arranged to be pivotally attached to the plastic edge portion;
   wherein the sheet metal material, the plastic connector and the plastic bottom have integrally formed connector structures that provide fastener-free connections between the plastic connector and the plastic bottom, and between the sheet metal material and the plastic bottom,
   wherein the closed peripheral wall formed by the sheet metal material and the plastic connector has the bottom end thereof connected to the plastic bottom by metal to plastic fastener-free connections at the bottom end of the sheet metal material and plastic to plastic fastener-free connections at the bottom end of the plastic connector,
   wherein the metal to plastic fastener-free connections include metal projections on the bottom end of the sheet metal material inserted into plastic receiving regions on the plastic bottom; and
   a carrying handle connected to the lid and enabling the container to be lifted and carried thereby, wherein the top plastic to plastic fastener free connection at the top end of the plastic connector bears at least some of the weight of the container portion and any contents thereof when the container is carried by the carrying handle.

18. The container of claim 17, wherein the plastic receiving regions on the plastic bottom are disposed on a first wall member, wherein resilient properties of the first wall member enable engagement between the metal projections and the plastic receiving regions to connect the plastic bottom to the bottom end of the sheet metal.

19. The container of claim 17, wherein the top metal to plastic fastener-free connections include top metal projections on the top end of the sheet metal material inserted into top plastic receiving regions on the plastic edge portion.

20. The container of claim 19, wherein the top plastic receiving regions on the plastic edge portion are disposed on a second wall member, wherein resilient properties of the second wall member enable engagement between the top metal projections and the top plastic receiving regions to connect the plastic edge portion to the top end of the sheet metal.

21. The container of claim 19, wherein the top plastic to plastic fastener-free connections include top plastic projections on the plastic edge portion inserted into top plastic receiving regions on the top end of the plastic connector.

22. The container of claim 17, wherein the plastic to plastic fastener-free connections include plastic projections on the plastic bottom inserted into plastic receiving regions on the bottom end of the plastic connector.

23. A container comprising:
- a sheet of metal material having a louver formed therein, the sheet of metal material forming a peripheral wall with a first side, a second side and a third side and having opposite first and second connecting ends, and a plastic connector being connected to the first connecting end and the second connecting end of the sheet metal and formed on a fourth side of the peripheral wall to thus form a closed peripheral wall;
- a plastic edge portion connected to a top end of the closed peripheral wall by top metal to plastic fastener-free connections at a top end of the sheet metal material and by top plastic to plastic fastener-free connections at a top end of the plastic connector;
- a plastic structure having opposing surfaces defining a receiving space therebetween, at least one of the surfaces having a projection thereon, the louver being received within the receiving space, and an edge of the louver engaging with the projection to prevent the louver from being removed from the receiving space,
- wherein the engagement between the louver on the sheet metal material and the projection on the plastic structure is configured to provide a fastener-free connection between the sheet metal material and the plastic structure,
- wherein the plastic connector and the plastic structure have integrally formed connector structures that provide fastener-free connection therebetween,
- wherein the closed peripheral wall formed by the sheet metal material and the plastic connector has the bottom end thereof connected to the plastic structure by metal to plastic fastener-free connections at the bottom end of the sheet metal material and plastic to plastic fastener-free connections at the bottom end of the plastic connector; and
- a carrying handle connected to a lid and enabling the container to be lifted and carried thereby, wherein the top plastic to plastic fastener free connection at the top end of the plastic connector bears at least some of the weight of the container portion and any contents thereof when the container is carried by the carrying handle.

* * * * *